Oct. 21, 1952  O. FALK  2,614,425
APPARATUS FOR VELOCITY MEASUREMENT OF A MOVING FLUID
Filed May 9, 1947  2 SHEETS—SHEET 1
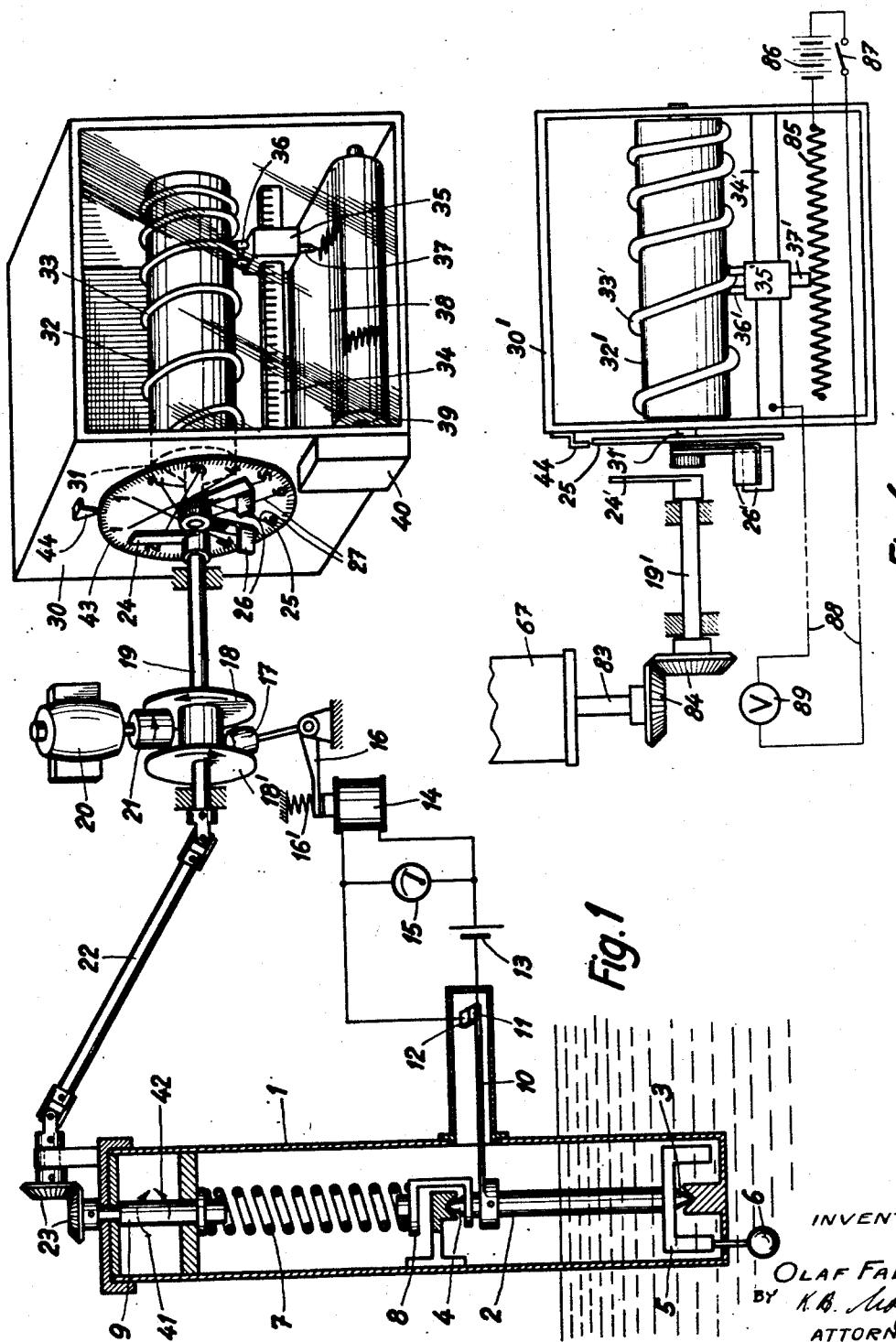
INVENTOR
OLAF FALK.
BY K.B. Mayr
ATTORNEY.

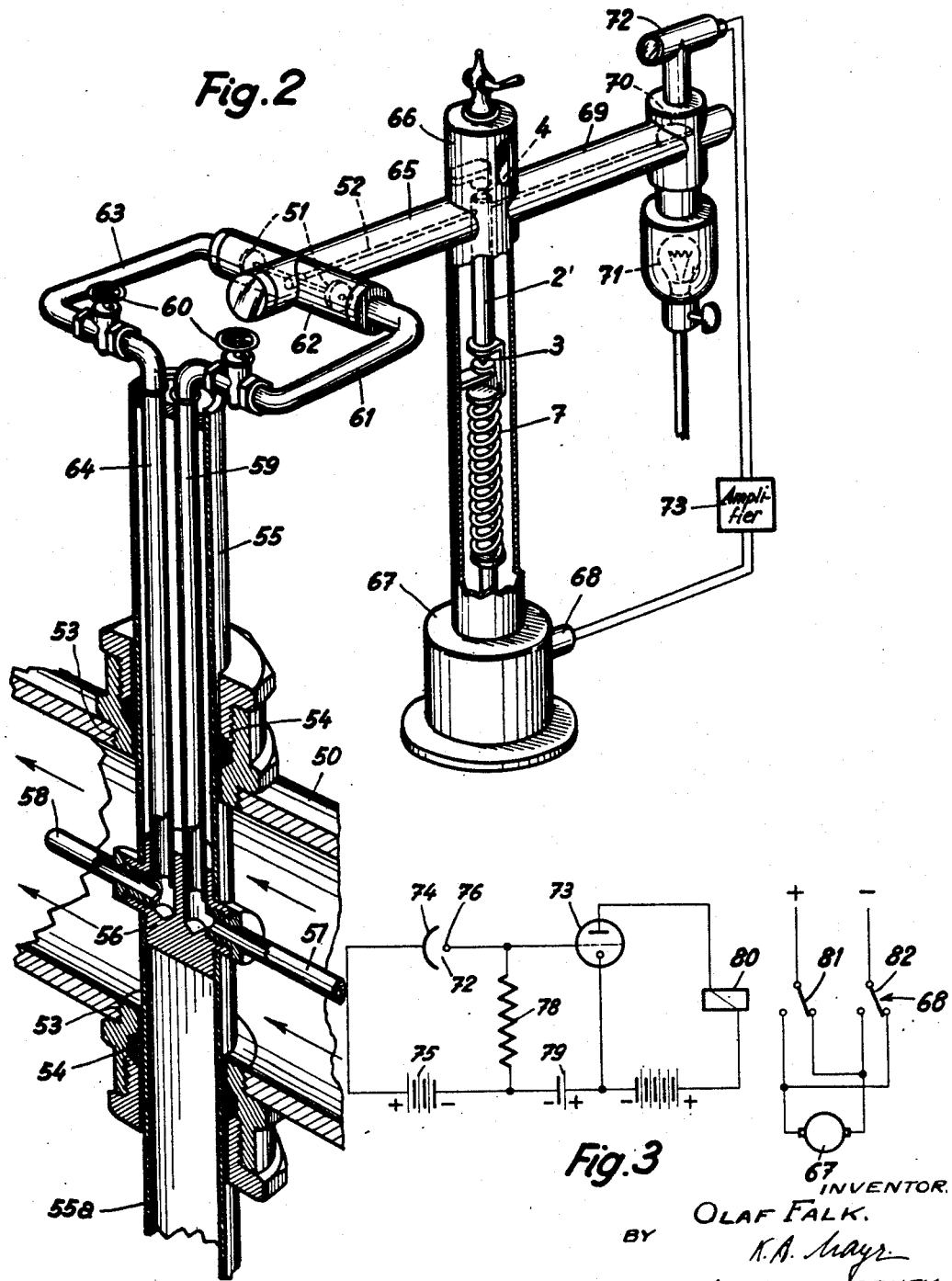

Patented Oct. 21, 1952

2,614,425

UNITED STATES PATENT OFFICE 2,614,425

APPARATUS FOR VELOCITY MEASUREMENT OF A MOVING FLUID

Olaf Falk, Oslo, Norway, assignor to Alfred J. Amsler & Co., Schaffhausen, Switzerland, a limited partnership of Switzerland Application May 9, 1947, Serial No. 747,046
In Norway February 27, 1943

2 Claims. (Cl. 73—228)

The invention relates to an apparatus for measuring the velocity of a flowing fluid by means which are responsive to the thrust exerted by the flowing fluid and which comprise means producing a force opposed to this thrust in order to hold the apparatus in its initial position. The force necessary to maintain the equilibrium, which the moving fluid tends to disturb, is used for indicating the velocity of the fluid.

The apparatus according to the invention comprises a mechanism counteracting the hydrodynamic thrust and compensating its effect on a movable member. This effect is used for indicating the velocity of the stream.

The accompanying drawing shows two modifications of an apparatus according to the invention.

Fig. 1 illustrates, schematically, an apparatus according to the invention;

Fig. 2 is a view in perspective, partly in section, of a modified apparatus according to the invention;

Fig. 3 is an electric wiring diagram for the apparatus shown in Fig. 2;

Fig. 4 is a diagrammatic illustration of a device for electrically indicating the measurements made by the apparatus according to Fig. 2.

With reference to Fig. 1, numeral 1 designates a hollow cylinder in the lower part of which a shaft 2 rotates in bearings 3 and 4. A U-shaped two-arm lever member 5 is fixed to the lower part of shaft 2, one arm of which member carries a thrust body 6, a sphere in the present case, which could also be in the form of a cylinder or a disc. A coil spring 7 is fixed at its lower end to a plate 8 fixed to shaft 2, and at its upper end to a shaft 9, coaxial with the shaft 2.

An arm 10, fixed at one end to the shaft 2, carries a member 11 adapted to make contact with a stationary member 12 for closing an electric circuit comprising a source of electric current 13 and a solenoid or electro-magnet 14 to which a voltmeter 15 is shunted. The core of the electro-magnet 14 acts against the action of spring 16' on one arm of a crank 16, the other arm of which carries a thrust roller 17 arranged between two interconnected friction discs 18 and 18' which are axially slidably connected with and drive a shaft 19. Axial displacement of the discs by the crank 16 causes pressing of one or the other of the discs against a roller 21 keyed on the shaft of an electric motor 20, in order to rotate the shaft 19 alternately in opposite directions. The shaft 19 is connected by means of a universal joint with a shaft 22, the latter being connected by means of another universal joint with bevel gears 23 which drive the shaft 9 for winding and unwinding spring 7.

The shaft 19 is connected to a recording instrument, which is seen on the right of Fig. 1. Driving shaft 31 of the recording instrument carries a disc 25 provided with two mobile stops or abutments 26 cooperating with an arm 24 fixed on shaft 19. Marks 27 indicate the position of abutments 26 and the extent of free rotation of the arm 24.

The recording instrument is arranged in a box 30. The shaft 31, carrying the disc 25, also carries a drum 32, on the circumference of which a metal wire 33 is mounted and wound according to a curve proper to the instrument. A slide 35 carrying a stylus 37 rides on a ruler 34, parallel to shaft 31. Two pins 36 connected with slide 35 extend astride wire 33 for moving the slide along ruler 34 upon rotation of shaft 31 and drum 32. The paper, on which the stylus is recording, is fed from a storage drum and advanced by a drum 39 actuated by the device 40 which may be a clockwork.

The apparatus operates as follows:

In order to measure the velocity of the moving fluid, the lower portion of cylinder 1 is immersed in the stream in such position that lever 5 is at a right angle to the direction of the stream. Thereupon motor 20 and the drive 40 of the drum 39 are started. If the contact 11, 12 is closed, disc 18 engages roller 21, and shaft 9 and spring 7 are rotated in the direction of arrow 41 until the contact opens, causing drum 21 fixed on the shaft of the motor 20 to cooperate with the friction disc 18', rotating the shafts 19, 22 and 9 in the opposite direction until the contact 11, 12 again closes, i. e. until the tension of spring 7 is sufficient to counteract the thrust acting on sphere 6. The tension of spring 7 is adjusted automatically, as, upon breaking of the circuit of the electro-magnet 14, spring 16' moves the roller 17 against the disc on the right (Fig. 1) and motor 20 acting through the drum 21, the friction disc 18', the shaft 22, the bevel gears 23, the shaft 9, winds up spring 7 in the direction of arrow 42.

Under the influence of the hydrodynamic pressure, the sphere 6 oscillates continuously together with the shaft 2, whereby the effect of friction in bearings 3 and 4 is eliminated.

The drum 32 of the recording instrument is rotated only through an angle equal to the difference between the one traveled by shaft 19 less the aperture angle between the two stops 26, whereby the distance between the points of the zigzag curve on the recording paper 38 is reduced.

The moving fluid, water, for example, exerts a hydrodynamic thrust on the sphere 6, which is proportional to the square of the velocity at which the fluid moves. The tension of the spring balancing this thrust is, consequently, proportional thereto. If the torsion angle $d$ of coil spring 7 is plotted in a coordinate system as ordinate and the speed V of the moving fluid as abscissa, the calibration curve will be according to the equation $d=k_1 \cdot V^2$, in which $k_1$ is a constant depending upon the size of the body exposed to the flowing fluid and of the spring, the leverage of the body exposed to the thrust, and the properties of the fluid. In order to take into account all these factors and to obtain a linear record of the velocity, a wire 33 is so coiled about a drum 32 as to produce a variable lead. The relation of the movements A of the stylus 37 to the speed to be measured depends on the linear function $V=k_2 \cdot A$. The curve recorded on the paper 38 may then be integrated in order to compute the mean value of the velocity during a certain time period.

The rule 34 is provided with a scale for instantaneous readings. Fractional revolutions of drum 32 are indicated on scale 43 on disc 25 moving opposite to a finger 44.

The voltmeter 15 serves to check the functioning of the instrument.

In the modification of the invention illustrated in Fig. 2, discs 51 are arranged in spaced relation at the extremity of an arm 52 in a calibrated pipe 62, which they do not obturate, the pipe being interposed in a fluid circuit by-passing a main stream flowing through a pipe 50, the velocity of which stream is to be measured.

Pipe 50 has two diametrically opposed threaded holes 53 in which stuffing boxes 54 are arranged. Inside tube 55 extending through the upper stuffing box and carrying the whole measuring apparatus, a connection member 56 is provided, in which are arranged inlet and outlet pipes 57 and 58. A tube 55a extends through the lower stuffing box and is fitted from below in the connection member 56. The coaxial pipes 55 and 55a serve as a guide for the whole apparatus which they support and afford movement of the inlet of pipe 57 to any portion of the cross-section of pipe 50 by axially sliding them in the stuffing boxes and by rotation about their longitudinal axis.

The water entering pipe 57 passes through conduit 59, valve 60, and conduit 61 into the calibrated pipe 62 and returns through conduit 63, a second valve 60, conduit 64, and the outlet pipe 58 to the main stream. The calibrated pipe 62 is traversed by another pipe 65 which communicates with a pipe 66 set at a right angle to pipe 65. In the latter is fitted between end bearings 3 and 4 a shaft 2' connected to a coiled spring 7, the lower part of which is connected to the shaft of a reversible motor 67 controlled by a reversing relay 68. The shaft 2 carries at its upper end the arm 52 to which the discs 51 are connected and another arm 69 with a blind 70 at its extremity, which, according to its position, does or does not intercept a luminous beam issued by a source of light 71, producing a variable illumination of a photo-electric cell 72. The electric current passing through this cell controls an electronic amplifier 73. The current passing through the latter actuates a reversing switch 68 of the servomotor 67, as well as a conventional telerecording device which is not illustrated.

The electric connections are illustrated more fully in the wiring diagram Fig. 3. The anode 74 of the photo-electric cell 72 is connected to the positive pole of battery 75 whose negative pole is connected through a resistor 78 to the cathode 76 of the cell which is also connected to the grid of the amplifier 73.

If the blind 70 prevents the light emitted by the source 71 from reaching the cell 72, the amplifier tube 73 is held in cut-off state by the bias battery 79. Therefore solenoid 80 in the anode circuit of tube 73 is de-energized and releases armatures 81 and 82 of the reversing switch 68 causing the direct current motor 67 to rotate the lower end of spring 7 counter-clockwise.

If the blind 70 is in a position to permit light to reach the photo-electric cell 72, a current flows from the positive pole of battery 75 through the photo-electric cell 72 and the resistor 78 to the negative pole of said battery. The voltage on resistor 78 overcomes the bias voltage of battery 79 and the grid of tube 73 becomes more positive. A current flows therefore through tube 73, energizing solenoid 80 for changing the position of its armatures 81 and 82 and actuating switch 68 to reverse motor 67 for tensioning spring 7.

In order to set the measuring device to zero, valves 60 are closed. Upon opening of valves 60, a stream is established and shaft 2' oscillates owing to the thrust exerted on the discs 51 and winds up spring 7. The oscillations are also transmitted to arm 69 and blind 70, which here plays the part of the contacts 11, 12 of the apparatus shown in Fig. 1. Otherwise the functioning of this model is the same as that of the first modification.

The teletransmission of the readings taken by the device according to the invention may be accomplished by conventional means. It will present no difficulty to an expert to transform these readings into a linear relation to the measured fluid velocity. For this purpose, the shaft of motor 67 is connected to a shaft as designated by numeral 19 in Fig. 1 and a device is used as shown on the right side of Fig. 1, the paper 38 and roll 39 being replaced by a conventional rheostat serving as a potentiometer and controlling a conventional voltmeter having a linear characteristic. Slide 35 is in this case built for controlling the rheostat. This is illustrated in Fig. 4 of the drawing. Shaft 83 of motor 67 drives bevel gears 84 for rotating shaft 19' provided with an arm 24'. The latter abuts against one of the arms 26' which are connected to one end of shaft 31' of drum 32' which is provided with a cam 33', actuating cam follower 35'. The latter slides on a rail 34'. Rail 34' and cam follower 35' are made of electrically conductive material, whereas the pins 36' forming part of the cam follower and engaging cam 33' are made of electrically insulating material. Cam follower 35' has a contact portion 37' sliding on rheostat 85 whose ends are electrically connected with a battery 86 when switch 87 is closed. Rail 34' and one end of rheostat 85 are connected by conduits 88 with a voltmeter 89.

What I claim is:

1. An apparatus for velocity measurement of a flowing fluid, comprising in combination, a tubular casing, a first shaft, a second shaft, and a coil spring, extending co-axially to one another in said casing in the longitudinal direction thereof, said first shaft being connected to said second shaft by said spring and being revolvably borne at its ends, an arm extending at a substantially right angle from said first shaft, a thrust body located outside of said casing and within the flowing fluid and being rigidly connected to said arm and adapted to impart a turning moment to said first shaft and to said spring, a source of rotary power connected with said second shaft, reversing means connected with said source for changing the direction of rotation thereof, actuating means controlled by said first shaft and connected with said reversing means for actuating same to rotate said second shaft counter to said turning moment to have said first shaft and said thrust body oscillating around an equilibrium position, and means responsive to the rotation of said second shaft until said equilibrium position is reached, thereby indicating the velocity of the flowing fluid, said last mentioned means including a rotatable drum operatively connected to said second shaft and provided with a helicoidal guide, the pitch of which varies proportionally to the gauging curve of the apparatus, a scale member parallel with the axis of said drum, a slide on said scale member, engaged by said guide for displacement along said scale member away from a zero position corresponding to a zero velocity of the moving fluid by an amount proportional to the momentary velocity of the moving fluid, a sheet of paper, means for feeding the latter in a uniform movement through a record position located below said scale member, and a writing means carried by said slide, for recording the displacements of said slide onto that portion of said sheet of paper which is momentarily located in said recording position.

2. An apparatus as defined in claim 1 comprising a recorder casing, a first axle being rotatably mounted in said recorder casing and having said drum fixed to it and an end portion protruding from said recorder casing, a disc fixed on said end portion and provided with two equal scale halves extending along its circumference in opposite directions from a common zero point, two stop members mounted on said end portion and angularly adjustable along said scale halves, a second axle connected with and rotated by said second shaft and extending coaxially to said first axle, and an arm fixed to said second axle and adapted to engage either one or the other of said stop members and to afford idle oscillation of said second axle to an extent limited by said stop members.

OLAF FALK.

REFERENCES CITED

The following references are of record in the file of this patent:

UNITED STATES PATENTS

| Number | Name | Date |
|---|---|---|
| 720,188 | Seidener | Feb. 10, 1903 |
| 1,998,110 | Warren | Apr. 16, 1935 |
| 2,316,255 | Knobel et al. | Apr. 13, 1943 |

FOREIGN PATENTS

| Number | Country | Date |
|---|---|---|
| 369,588 | Great Britain | Mar. 21, 1932 |